Nov. 27, 1945.  A. Y. DODGE  2,389,961
ONE-WAY CLUTCH
Filed April 22, 1943
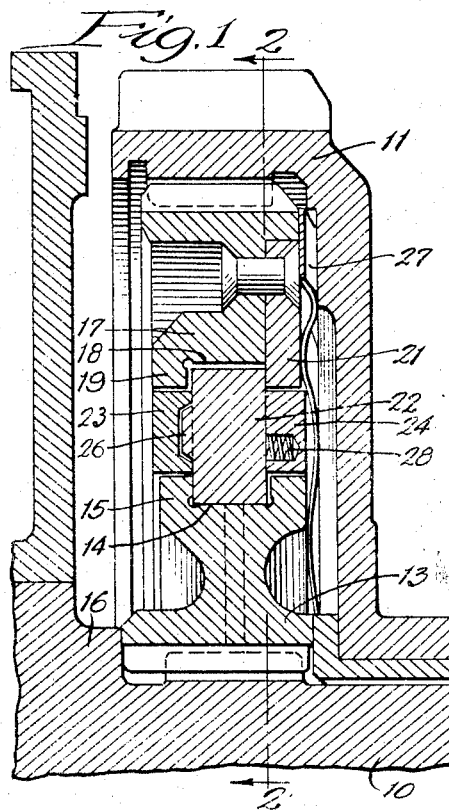
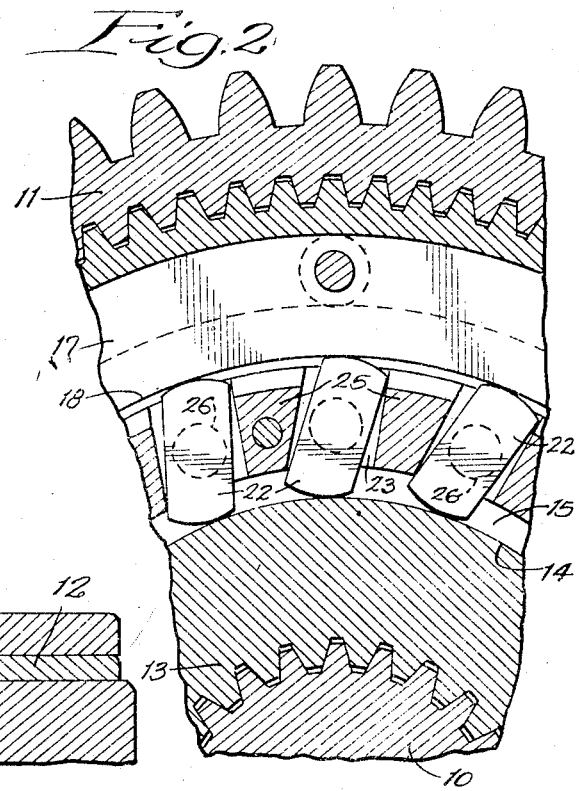
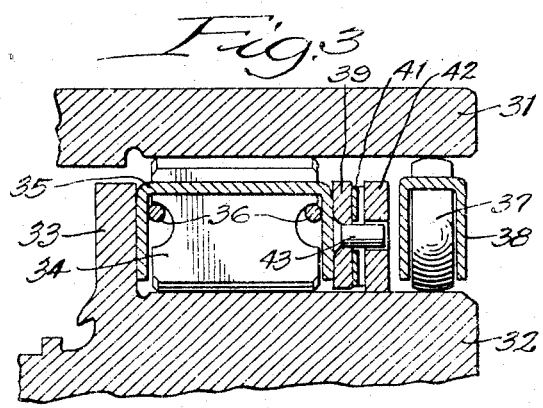
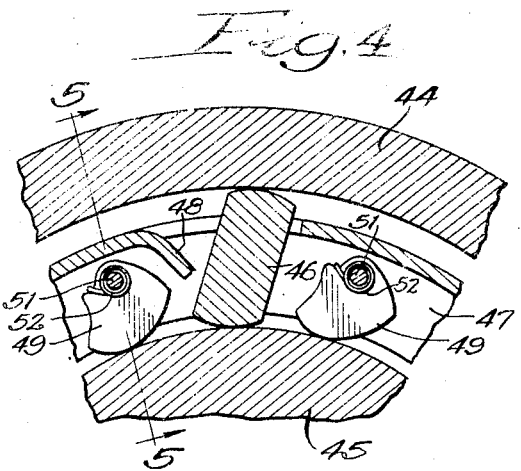
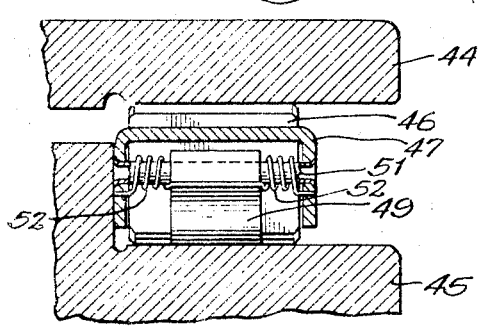
Inventor.
Adiel Y. Dodge,
By Dawson, Ooms & Booth,
Attorneys.

Patented Nov. 27, 1945

2,389,961

UNITED STATES PATENT OFFICE 2,389,961

ONE-WAY CLUTCH

Adiel Y. Dodge, Rockford, Ill.

Application April 22, 1943, Serial No. 484,031

10 Claims. (Cl. 192—45.1)

This invention relates to a one-way clutch and more particularly to a one-way clutch of the tilting gripper type.

One-way clutches employing tilting grippers engageable with smooth race surfaces have heretofore been proposed but in most of these clutches, the grippers do not engage with sufficient rapidity to handle impulse loads of relatively high frequency of torque reversal so that an undesirable amount of back lash and in some cases, objectionable chattering occur.

It is one of the objects of the present invention to provide a one-way clutch in which the grippers engage rapidly to eliminate back lash and to enable a high frequency impulse load to be handled.

Another object of the invention is to provide a one-way clutch in which the grippers are urged into and out of engagement with the races by friction means cooperating therewith.

Another object of the invention is to provide a one-way clutch in which friction acts directly on the grippers to tilt them into engaged position.

A further object of the invention is to provide a one-way clutch in which friction means acts on a cage holding the grippers to urge the grippers into engagement.

Still another object of the invention is to provide a one-way clutch in which friction means operable with varying degrees of friction in different directions controls tilting of the grippers into engagement.

The above and other objects and advantages of the invention will be more readily apparent from the following description when read in connection with the accompanying drawing, in which—

Figure 1 is a partial axial section of a one-way clutch embodying the invention;

Figure 2 is a section on the line 2—2 of Figure 1;

Figure 3 is a partial section similar to Figure 1 of another form of clutch;

Figure 4 is a partial transverse section of still another form of clutch; and

Figure 5 is a section on the line 5—5 of Figure 4.

The clutch of Figure 1 is designed to connect inner shaft 10 to a gear 11 which is rotatably supported on the shaft 10 on a bearing 12. The shaft 10 has splined or otherwise secured thereto an inner race 13 formed with a cylindrical surface 14 to engage the clutch grippers and having rims or flanges 15 at the opposite sides of the surface 14. The race 13 is held against longitudinal movement by a shoulder 16 on the shaft 10 at one side and by an upturned portion of the bearing 12 at its opposite side.

An outer race 17 is slidably splined in the gear 11 and is formed with a cylindrical surface 18 for engagement with the grippers. A shoulder 19 integrally formed at one side of the surface 18 serves to confine the grippers therein and a similar shoulder is formed at the opposite side by a separate plate or ring 21 secured to the race 17.

A series of grippers 22 are mounted between the races to engage the surfaces 14 and 18 thereof respectively. The grippers as best seen in Figure 2, are formed with flat sides and arcuate ends shaped about spaced centers and may be of the type more particularly described and claimed in my copending application, Serial No. 479,695 filed March 19, 1943.

The grippers are partially supported by a cage formed of opposed rings 23 and 24 connected by cross bars 25 to provide a rigid cage structure holding the grippers properly spaced around the races. The rings 23 and 24 lie between the flanges 15, 19 and 21 and act as a steady rest between the two races. The rings and flanges are in running contact, although, under normal conditions these rings do not carry any substantial bearing load. The grippers may be held against radial removal from the cage by bosses or projections 26 on the grippers fitting into corresponding depressions in one of the rings.

In operation, when the inner race is turning counter-clockwise relative to the outer race as seen in Figure 2, the grippers will be tilted clockwise to disengage the races so that they can rotate freely relative to each other. When, however, the inner race tends to turn clockwise relative to the outer race, the grippers will engage the surfaces 14 and 18 to lock the races together. In order to facilitate tilting of the grippers to locking position friction means are provided engaging the grippers tending to tilt them into locked position when the inner race turns clockwise relative to the outer race. As shown in Figure 1, this friction effect is accomplished by causing the grippers to engage the side flanges of the races and to exert a friction drag thereon which will tend to tilt the grippers.

As shown in Figure 1, the friction effect is produced by a flat spring 27 having a sinuous shape and fitting within the gear 11 to engage the outer race 17 and urge it to the left. This causes the plate or ring 21 to engage the right side of the grippers adjacent the outer end thereof and to force the left side of the grippers adjacent the inner end thereof into engagement with the left hand flange 15 of the inner race. In order to insure that all grippers are properly engaged with one or the other of the friction surfaces individual coil springs 28 may be employed carried in sockets in the ring 24 and engaging the grippers to urge them to the left. Thus, if any one gripper is slightly undersize, it will at least engage the flange 15 at its inner end to be tilted thereby. With this construction, the grippers are positively tilted into engagement with the races upon initial movement of the inner race clockwise relative to the outer race so that the clutch will engage very quickly with a minimum of back lash and is capable of handling an impulse load of high frequency.

Figure 3 shows an alternative construction including an outer race 31 and an inner race 32 having a stop shoulder 33 at one end thereof. Grippers 34 are supported between the races in a cage 35 and are held in the cage and urged toward gripping position by annular wire springs 36 as is more particularly described and claimed in my copending application, Serial No. 491,007, filed June 16, 1943. The races may be connected for free rotation by a bearing unit including bearing rollers 37 supported in a cage 38 and lying beside the gripper assembly as shown.

In order to urge the grippers of this unit into engaged position, the cage itself is engaged by friction means tending to cause it to turn with the inner race. Under normal conditions, the gripper cage will turn with the outer race due to centrifugal pressure of the grippers on the outer race and when the cage is connected frictionally to the inner race, the drag causes it to apply pressure to the grippers which may be utilized to tilt them into engagement. As shown, the cross bars of the cage engage the grippers above their radial center although it will be apparent that by reversing the direction of the grippers, the same effect could be produced if the cage engaged them below radial center.

As shown in Figure 3, friction drag is applied to the cage by a disc 39 engaging the side of the cage opposite the shoulder 33 and pressed against the cage by a spring 41. The spring engages the disc 39 on one side and presses on its other side against a disc 42 which has a press-fit or is otherwise connected to the inner race to turn therewith. Pins 43 connected to one of the discs pass loosely through openings in the other disc so that the two discs cannot rotate relative to each other.

In operation, the disc 39 exerts a light friction drag on the cage tending to turn it with the inner race. When the clutch is overrunning the cage will normally turn with the outer race against this light friction drag but upon reversal of torque, the cross bars of the cage will apply a force to the grippers tending to turn them into engaged position.

Figures 4 and 5 illustrate still another construction in which a variable friction force is provided tending to turn the cage with the inner race. As shown in these figures, an outer race 44 and an inner race 45 are connected by grippers 46 supported in a cage 47. As shown in Figure 4, the cage is bent down at 48 at one side of each gripper to engage the gripper radially inward of its center.

Friction drag is applied to the cage by rocking friction cam members 49 pivoted on cross rods 51 and urged in a direction to engage the inner race by springs 52. The cam members as shown have a relatively sharp angle of engagement with the inner race, the angle preferably being such under all conditions that its tangent exceeds the coefficient of friction between the inner race and the cam member so that the two will not lock together. The cam members are so shaped as seen in Figure 4, that their centers of gravity lie to the right of a radial line through their pivotal axis so that centrifugal force will assist the springs 52 in holding the cam members in engagement with the inner race.

When the inner race is turning counterclockwise relative to the outer race as seen in Figure 4, the cam members will be turned in a direction to release the inner race so that they will exert only a very light friction drag thereon. However, when the direction of rotation is reversed, the cam members will engage the inner race with a greater force due to the tendency of their friction drag to turn them in a direction to wedge against the inner race so that the friction drag on the cage will be increased. This will tend to turn the cage clockwise with the inner race so that the tongues 48 will engage the grippers below center and tilt them in a direction to lock the races together. Thus the grippers will operate with a minimum back lash and with sufficient rapidity to handle high frequency loads.

While several embodiments of the invention have been shown and described in detail, it will be understood that the invention might be embodied in other forms, and that those shown are illustrative only, reference being had to the appended claims to determine the scope of the invention.

What is claimed is:

1. A one way clutch comprising inner and outer coaxial races, a plurality of separate tiltable grippers between the races tiltable to one position to hold the races against relative rotation in one direction and to another position to release the races, a flange at one end of one of the races engageable with the sides of the grippers at the end thereof adjacent said one of the races, and resilient means urging the grippers into frictional engagement with the flange.

2. A one way clutch comprising inner and outer coaxial races, means supporting the races for relative axial movement, tiltable grippers between the races, flanges on the races to engage the sides of the grippers adjacent their opposite ends, and resilient means urging one of the races axially relative to the other so the flanges will engage and exert a friction drag on the grippers tending to tilt them.

3. A one way clutch comprising inner and outer coaxial races, means supporting the races for relative axial movement, tiltable grippers between the races, flanges on the races to engage the sides of the grippers adjacent their opposite ends, resilient means urging one of the races axially relative to the other so the flanges will engage and exert a friction drag on the grippers tending to tilt them, and additional resilient means acting on the individual grippers to urge them toward one of the flanges.

4. A one way clutch comprising inner and outer coaxial races, means supporting the races for relative axial movement, tiltable grippers between the races, a cage having side rings and cross bars lying between adjacent grippers, flanges on the races to engage the sides of the grippers adjacent their opposite ends, resilient means urging one of the races axially relative to the other so the flanges will engage and exert a friction drag on the grippers, and a plurality of springs carried by one of the side rings and engaging the grippers respectively to urge them into engagement with one of the flanges.

5. A one way clutch comprising inner and outer coaxial races, a series of tiltable grippers between the races, a cage supporting and spacing the grippers and having cross bars engageable with the grippers at points spaced from their radial centers, and friction means acting between the cage and one of the races to cause the cross bars to exert a tilting force on the grippers.

6. A one way clutch comprising inner and outer coaxial races, a series of tiltable grippers between the races, a cage supporting and spacing the grippers and having cross bars engageable with the grippers at points spaced from their radial centers, and friction means acting between the cage and the inner race to cause the cross bars to exert a tilting force on the grippers.

7. A one way clutch comprising inner and outer coaxial races, a series of tiltable grippers between the races, a cage supporting and spacing the grippers and having cross bars engageable with the grippers at points spaced from their radial centers, and a tiltable cam carried by the cage and engageable with one of the races to exert a frictional force thereon which is greater in one direction of relative rotation than in the other.

8. A one way clutch comprising inner and outer coaxial races, a series of tiltable grippers between the races, a cage supporting and spacing the grippers and having cross bars engageable with the grippers at points spaced from their radial centers, and a tiltable cam carried by the cage and engageable with one of the races to exert a frictional force thereon which is greater in one direction of relative rotation than in the other, said tilting cam being unbalanced about a radius from the center of the races through its tilting axis whereby centrifugal force on the cam will urge it in a direction to engage said one of the races.

9. A one way clutch comprising inner and outer coaxial races, a series of tiltable grippers between the races, a cage supporting and spacing the grippers and having cross bars engageable with the grippers at points spaced from their radial centers, a cam pivoted on the cage and engageable with the inner race to produce a friction drag between the cage and the inner race, the cam being unbalanced about its pivotal axis so that centrifugal force will tend to turn it in a direction to engage the inner race, and a spring acting on the cam to turn it in a direction to engage the inner race.

10. A one way clutch comprising inner and outer coaxial races, a cage having side rings connected by cross bars lying between adjacent grippers, flanges on the races overlying the sides of the grippers and in running contact with the cage side rings, and means urging one of the races axially relative to the other to cause the flanges to frictionally engage the sides of the grippers adjacent their opposite ends.

ADIEL Y. DODGE.